(12) United States Patent
Natanzon et al.

(10) Patent No.: US 11,314,601 B1
(45) Date of Patent: Apr. 26, 2022

(54) AUTOMATED CAPTURE AND RECOVERY OF APPLICATIONS IN A FUNCTION-AS-A-SERVICE ENVIRONMENT

(71) Applicant: EMC IP Holding Company LLC, Hopkinton, MA (US)

(72) Inventors: Assaf Natanzon, Tel Aviv (IL); Amit Lieberman, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 409 days.

(21) Appl. No.: 15/791,763

(22) Filed: Oct. 24, 2017

(51) Int. Cl.
*G06F 11/14* (2006.01)

(52) U.S. Cl.
CPC ...... *G06F 11/1464* (2013.01); *G06F 2201/84* (2013.01)

(58) Field of Classification Search
CPC ............. G06F 11/1464; G06F 2201/84; G06F 16/252; G06F 16/288; G06F 16/48; G06F 16/21; G06F 16/2428; G06F 16/282; G06F 16/9024; G06F 16/951; G06F 16/2372; G06F 16/273
See application file for complete search history.

(56) References Cited

U.S. PATENT DOCUMENTS

| | | | |
|---|---|---|---|
| 6,067,550 | A | 6/2000 | Lomet |
| 6,490,594 | B1 | 12/2002 | Lomet |
| 6,978,279 | B1 | 12/2005 | Lomet et al. |
| 7,386,752 | B1 | 6/2008 | Rakic et al. |
| 7,702,779 | B1 * | 4/2010 | Gupta .............. G06F 9/50 709/224 |
| 8,577,842 | B1 | 11/2013 | Nagargadde et al. |
| 8,713,362 | B2 | 4/2014 | Griffith et al. |

(Continued)

OTHER PUBLICATIONS

Amazon Web Services, Inc., "AWS Serverless Mutli-Tier Architectures Using Amazon API Gateway and AWS Lambda," Amazon Web Services, Nov. 2015, 20 pages.

(Continued)

*Primary Examiner* — Pierre M Vital
*Assistant Examiner* — Andalib F Lodhi
(74) *Attorney, Agent, or Firm* — Ryan, Mason & Lewis, LLP

(57) ABSTRACT

An apparatus in one embodiment comprises at least one processing platform including a plurality of processing devices. The processing platform is configured to receive a request to execute an application in a function-as-a-service ("FaaS") environment, to initiate execution of the application responsive to the request, and to invoke a plurality of application functions with each such application function interacting with one or more backend services in executing the application. The processing platform is further configured to automatically generate an application manifest characterizing relationships between the application functions and the backend services utilized in executing the application, to capture state of the application for a particular point in time based at least in part on the application manifest, and to perform operational recovery of the application for the particular point in time utilizing the captured state. The application manifest illustratively comprises a graph having a plurality of nodes corresponding to respective ones of the application functions and the backend services.

20 Claims, 7 Drawing Sheets

(56) References Cited

U.S. PATENT DOCUMENTS

| | | | |
|---|---|---|---|
| 9,461,969 B2 | 10/2016 | Watt | |
| 9,477,415 B2 | 10/2016 | Hsu et al. | |
| 9,619,350 B1 | 4/2017 | Ambat et al. | |
| 9,684,607 B2 | 6/2017 | Teletia et al. | |
| 9,762,450 B2* | 9/2017 | Xie | H04L 41/0843 |
| 9,893,947 B2 | 2/2018 | Morgan et al. | |
| 9,906,415 B2 | 2/2018 | Morgan et al. | |
| 10,248,345 B1 | 4/2019 | Dickson | |
| 10,409,995 B1* | 9/2019 | Wasiq | H04L 63/1433 |
| 11,044,173 B1* | 6/2021 | Mestery | H04L 41/5051 |
| 2001/0049704 A1 | 12/2001 | Hamburg et al. | |
| 2006/0041602 A1 | 2/2006 | Lomet et al. | |
| 2008/0115134 A1 | 5/2008 | Elliott et al. | |
| 2008/0307347 A1* | 12/2008 | Cisler | G06F 11/1458 715/771 |
| 2009/0144336 A1* | 6/2009 | Culpepper | G06F 8/60 |
| 2009/0157882 A1* | 6/2009 | Kashyap | H04L 67/1034 709/227 |
| 2010/0049929 A1* | 2/2010 | Nagarkar | G06F 11/1415 711/162 |
| 2012/0159468 A1* | 6/2012 | Joshi | G06F 8/61 717/172 |
| 2012/0233123 A1* | 9/2012 | Shisheng | G06F 11/004 707/639 |
| 2014/0149354 A1 | 5/2014 | Chan et al. | |
| 2014/0181021 A1* | 6/2014 | Montulli | G06F 16/137 707/624 |
| 2015/0096011 A1* | 4/2015 | Watt | H04L 63/0272 726/15 |
| 2015/0317216 A1 | 11/2015 | Hsu et al. | |
| 2015/0347286 A1* | 12/2015 | Kruglick | H04L 43/50 714/38.1 |
| 2015/0355985 A1 | 12/2015 | Holtz et al. | |
| 2016/0132310 A1* | 5/2016 | Koushik | G06F 9/452 717/176 |
| 2016/0162378 A1 | 6/2016 | Garlapati et al. | |
| 2016/0170666 A1* | 6/2016 | Hsu | G06F 11/1446 711/162 |
| 2016/0246735 A1 | 8/2016 | Teletia et al. | |
| 2016/0292045 A1 | 10/2016 | Pillai et al. | |
| 2017/0006135 A1* | 1/2017 | Siebel | H04L 69/16 |
| 2017/0060605 A1 | 3/2017 | Huang et al. | |
| 2017/0161023 A1* | 6/2017 | Khazanchi | G06F 8/20 |
| 2017/0214708 A1* | 7/2017 | Gukal | G06F 16/285 |
| 2017/0242871 A1* | 8/2017 | Kilaru | G06F 11/2094 |
| 2017/0255474 A1 | 9/2017 | Yu et al. | |
| 2017/0270055 A1 | 9/2017 | Teletia et al. | |
| 2017/0352115 A1* | 12/2017 | Trevathan | G06Q 50/184 |
| 2017/0353348 A1* | 12/2017 | Gunjal | H04L 41/5058 |
| 2018/0254998 A1* | 9/2018 | Cello | H04L 41/5019 |
| 2019/0014171 A1* | 1/2019 | Stein | G06F 9/542 |
| 2019/0182128 A1 | 6/2019 | Shimamura et al. | |

OTHER PUBLICATIONS

"AWS Step Functions, Build Distributed Applications Using Visual Workflows," https://aws.amazon.com/step-functions/, 2017, 2 pages.

Amazon Web Services, Inc., "AWS Lambda Developer Guide," Amazon Web Services, 2017, 473 pages.

wikipedia.com, "Serverless Computing," https://en.wikipedia.org/wiki/Serverless_computing, Jul. 17, 2017, 4 pages.

U.S. Appl. No. 15/666,793 filed in the name of Assaf Natanzon et al. on Aug. 2, 2017 and entitled "Operational Recovery of Serverless Applications in a Cloud-Based Compute Services Platform."

U.S. Patent Application filed in the name of Amit Lieberman et al. on Oct. 24, 2017 and entitled "Directional Consistency in Capture and Recovery of Cloud-Native Applications."

* cited by examiner

AUTOMATED CAPTURE AND RECOVERY OF APPLICATIONS IN A FUNCTION-AS-A-SERVICE ENVIRONMENT

FIELD

The field relates generally to information processing systems, and more particularly to compute services in information processing systems.

BACKGROUND

Many information processing systems are configured to provide cloud-based compute services to users over a network. In some cases, the compute services utilize so-called serverless applications that do not maintain application state information. Instead, state is kept in external persistent services such as databases and object stores. As a result, recovering a serverless application after a failure or other issue can be problematic under conventional practice. For example, it is often necessary for an administrator or other user to perform manual backups of the application state for a serverless application at multiple points in time in order to permit recovery from those points in time. Such manual backups of serverless applications are complex, time consuming and error prone. In some cases, an administrator or other user may have to coordinate multiple sets of complicated processes to document and track potentially large numbers of changes in versions as well as deployment runtime environments for a variety of distinct components of a serverless application. It is therefore unduly difficult to guarantee successful operational recovery for such applications.

SUMMARY

Illustrative embodiments provide techniques for automated capture and recovery of serverless applications and other types of applications in a Function-as-a-Service ("FaaS") environment comprising at least one cloud-based compute services platform. For example, some embodiments are configured to implement automated capture of application state utilizing a predetermined graph-based application manifest comprising a set of interconnected nodes corresponding to respective ones of a plurality of application functions and associated backend services. Such embodiments can advantageously provide significantly improved efficiency in automated capture and recovery of application state in a FaaS environment without the need for manual intervention.

In one embodiment, an apparatus comprises at least one processing platform including a plurality of processing devices. The processing platform is configured to receive a request to execute an application in a FaaS environment, to initiate execution of the application responsive to the request, and to invoke a plurality of application functions with each such application function interacting with one or more backend services in executing the application. The processing platform is further configured to automatically generate an application manifest characterizing relationships between the application functions and the backend services utilized in executing the application, to capture state of the application for a particular point in time based at least in part on the application manifest, and to perform operational recovery of the application for the particular point in time utilizing the captured state.

By way of example, the application manifest illustratively comprises a graph having a plurality of nodes corresponding to respective ones of the application functions and the backend services, with edges between respective pairs of the nodes each indicating one of an invocation of a particular one of the backend services by a particular one of the application functions and an invocation of a particular one of the application functions by a particular one of the backend services.

Capturing state of the application for a particular point in time based at least in part on the application manifest in some embodiments comprises determining at least one set of connected nodes for the application in the graph, generating a backup of the set of connected nodes, and generating backups for respective ones of any of the backend services having corresponding nodes in the set of connected nodes.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
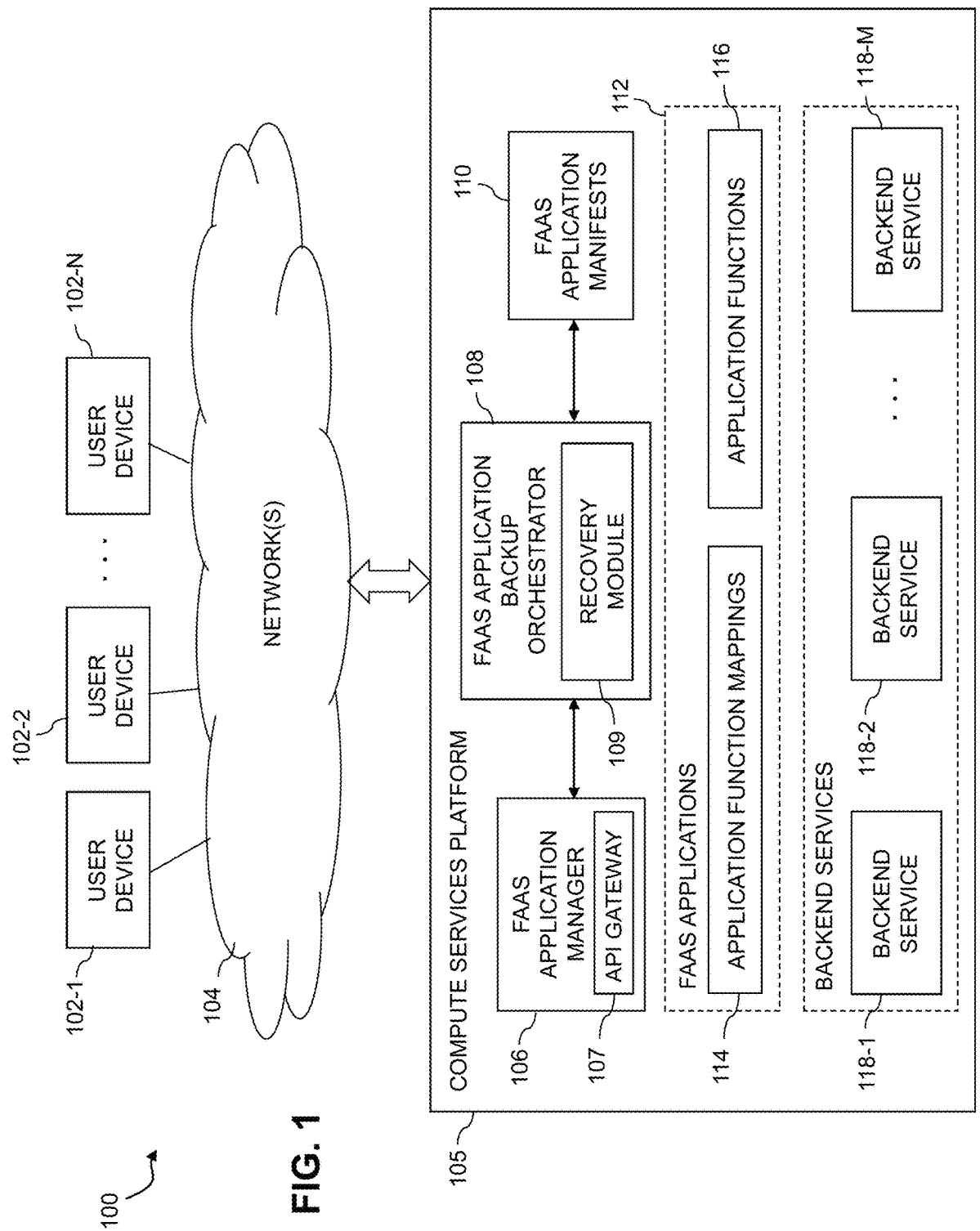
FIG. 1 is a block diagram of an information processing system comprising a cloud-based compute services platform configured for automated capture and recovery of applications in a FaaS environment in an illustrative embodiment.

FIG. 1 shows an information processing system 100 configured in accordance with an illustrative embodiment.

The information processing system 100 comprises user devices 102-1, 102-2, ... 102-N. The user devices 102 communicate over a network 104 with a compute services platform 105.

The user devices 102 can comprise, for example, desktop, laptop or tablet computers, mobile telephones, or other types of processing devices capable of communicating with the compute services platform 105 over the network 104. The variable N and other similar index variables herein such as M are assumed to be arbitrary positive integers greater than or equal to two.

The term "user" herein is intended to be broadly construed so as to encompass numerous arrangements of human, hardware, software or firmware entities, as well as combinations of such entities. Compute services are assumed to be provided for users under a Function-as-a-Service (FaaS) model, although it is to be appreciated that other types of cloud infrastructure arrangements could be used. For example, at least a portion of the available compute services in some embodiments may additionally or alternatively be provided under a Platform-as-a-Service (PaaS) model.

The compute services platform 105 in the present embodiment is therefore assumed to implement at least a portion of a FaaS environment accessible to the user devices 102 over the network 104.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

The compute services platform 105 implements compute services on behalf of respective cloud infrastructure tenants each corresponding to one or more users associated with respective ones of the user devices 102. By way of example, the compute services are assumed to include execution of one or more serverless applications on behalf of each of one or more users associated with respective user devices 102, although it should be understood that illustrative embodiments are not limited to serverless applications, but are more generally applicable to any applications that execute at least in part within a FaaS environment.

The compute services platform 105 in some embodiments may be implemented as part of cloud infrastructure in the form of a cloud-based system such as an Amazon Web Services (AWS) system. Other examples of cloud-based systems that can be used to provide at least portions of the compute services platform 105 and possibly other portions of system 100 include Google Cloud Platform (GCP) and Microsoft Azure.

As a more particular example, the compute services platform 105 in some embodiments may be configured to implement a serverless application architecture similar to the AWS Lambda serverless application architecture, as described in reference documents of Amazon Web Services, Inc. entitled "AWS Lambda: Developer Guide," 2017, and "AWS Serverless Multi-Tier Architectures, Using Amazon API Gateway and AWS Lambda," November 2015, both of which are incorporated by reference herein.

These and other serverless application architectures referred to herein allow users to build and run applications without the need to provision, maintain or otherwise manage any servers. Although a given compute services platform implementing such an architecture may include servers, the applications are referred to as "serverless" in that the applications can be run and scaled without user reference to any particular server or servers and the user is therefore relieved of any server-related issues. The term "serverless" should therefore not be construed as indicating that a compute services platform or other processing platform that executes a given serverless application cannot include any servers. Advantages of serverless application architectures include scalability and reduced operational costs as well as finely-grained metering of compute services actually utilized by platform users.

Again, references herein to serverless applications are intended as examples of applications that may be executed in a FaaS environment. Other types of applications can be executed in a FaaS environment in other embodiments.

The compute services platform 105 in the embodiment of FIG. 1 illustratively comprises a FaaS application manager 106 having an application programming interface (API) gateway 107. The FaaS application manager 106 interacts with a FaaS application backup orchestrator 108 that includes a recovery module 109. The FaaS application backup orchestrator 108 utilizes FaaS application manifests 110 to control capture and recovery of corresponding FaaS applications 112. The FaaS applications 112 can comprise serverless applications or other types of applications that execute at least in part within a FaaS environment such as that provided by the compute services platform 105. The FaaS applications 112 are examples of what are more generally referred to herein as simply "applications."

Each of the FaaS applications 112 of the compute services platform 105 in the FIG. 1 embodiment includes one or more application function mappings 114 and one or more application functions 116. The application functions 116 interact with backend services 118-1, 118-2, ... 118-M of the compute services platform 105. The FaaS applications 112 can in some cases be configured to implement a compute services solution for a particular business or other organization, such as a shopping cart application for an electronic commerce web site or a mobile banking application for a financial institution. A wide variety of different types of applications can be implemented in the compute services platform 105 in order to meet the particular needs of platform users.

It is assumed that the compute services platform 105 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The FaaS application manager 106 of the compute services platform 105 is configured to receive a request to execute one of the FaaS applications 112 and to initiate execution of the FaaS application responsive to the request. The request initiating execution of the FaaS application is received in the API gateway 107 of the compute services platform 105 from one of the user devices 102 over network 104. The request to initiate execution of the FaaS application can also be triggered by particular events, such as the creation of an object in an object store bucket, an operation on a database, and many other different types of events. As noted above, the FaaS applications in some cases include serverless applications executed by the compute services platform 105 in accordance with a FaaS model.

A given one of the FaaS applications 112 executed in the compute services platform 105 under the control of the FaaS application manager 106 illustratively comprises one or more of the application function mappings 114, one or more of the application functions 116 and utilizes one or more of the backend services 118.

Accordingly, the FaaS application manager 106 utilizes one or more of the application function mappings 114 to invoke one or more of the application functions 116 with each such application function interacting with one or more of the backend services 118 in executing the FaaS application.

The application function mappings 114 each specify one or more conditions under which particular ones of the application functions 116 are invoked. For example, the conditions specified by the application function mappings 114 may comprise respective events each relating to one or more of the backend services 118.

These and other conditions instruct the compute services platform 105 to activate the corresponding instances of the application functions 116. Examples of conditions that may be part of one or more of the application function mappings 114 include an object being uploaded to an AWS S3 bucket, a transaction being committed on a relational database, and a message being sent to a queue.

Other example conditions relate to events associated with designated URL endpoints. For example, one possible condition can be an event defined as a POST request arriving at a URL endpoint denoted my-app-dns/my-app-api/data. These and other conditions of this type not only indicate when to execute the application functions, but also map particular endpoints to certain application functions.

The various conditions that may be specified by the application function mappings 114 can include simple conditions as well as more complex conditions each based on filtering of multiple simpler conditions.

The application functions 116 are each assumed to execute in one or more stateless ephemeral containers of the compute services platform 105. Such containers can include the above-noted Docker containers or other types of LXCs. The containers are illustratively configured to respond to external events and to interact with backend services 118. The application functions 116 more particularly comprise stateless functions packaged as containers that will be invoked according to the conditions specified in one or more of the application function mappings 114. The application functions 116 can interact with one or more of the backend services 118 to read and store data using those backend services. For example, a given one of the application functions 116 can comprise a Python script that reads an image from an AWS S3 object store and creates a thumbnail for it.

The backend services 118 illustratively comprise at least one of a database service, an object storage service and a message processing service, although a wide variety of additional or alternative services can be supported in the compute services platform 105. More particular examples of backend services 118 include AWS S3, GCP Cloud Storage, Microsoft Azure Blob Storage, DynamoDB, MongoDB, Amazon Aurora and Oracle database. Although the backend services 118 in the present embodiment are shown as part of the compute services platform 105, at least a subset of these backend services in other embodiments may be implemented on one or more other processing platforms that are accessible to the compute services platform 105 over one or more networks.

Figure 2:
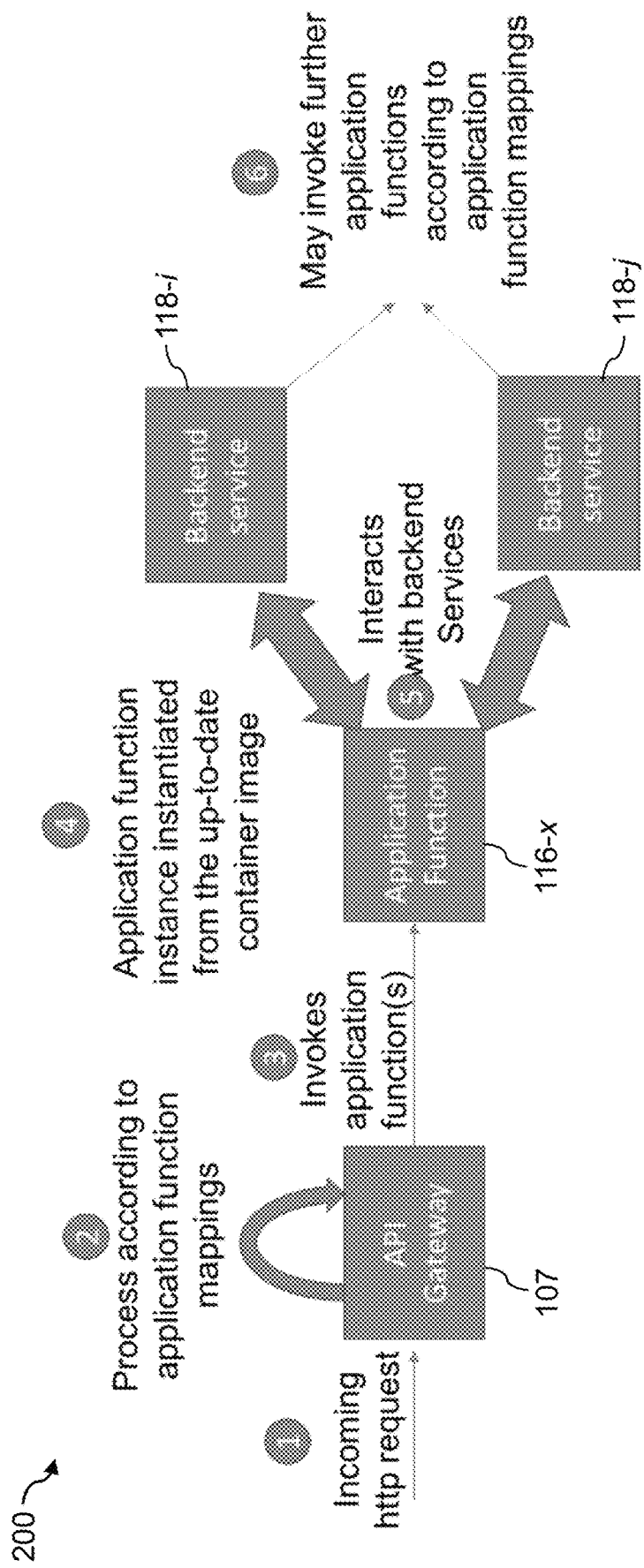
FIG. 2 is a diagram showing interactions between application function mappings, application functions and backend services in a cloud-based compute services platform in an illustrative embodiment.

FIG. 2 illustrates example interactions 200 between particular ones of the application function mappings 114, application functions 116 and backend services 118 of compute services platform 105. These example interactions 200 are assumed to occur in conjunction with the execution of a given one of the FaaS applications 112 under the control of the FaaS application manager 106. The given FaaS application is also referred to in this context and other contexts herein as simply an "application."

The interactions 200 shown in FIG. 2 are arranged in multiple steps denoted as Step 1 through Step 6, and involve API gateway 107, a particular application function 116-x, and particular backend services 118-i and 118-j.

In Step 1, an incoming request to initiate execution of the application is received in the API gateway 107 of the FaaS application manager 106. The request in this embodiment more particularly comprises an HTTP request received in the compute services platform 105 over the network 104 from one of the user devices 102.

In Step 2, the incoming request is processed by the FaaS application manager 106 using one or more of the application function mappings 114 that are determined to be associated with the request.

In Step 3, the API gateway 107 based on the processing in accordance with the one or more of the application function mappings 114 invokes one or more of the application functions 116. This illustratively includes at least application function 116-x, and may include additional application functions.

In Step 4, an instance of the application function 116-x is instantiated by the FaaS application manager 106 using a corresponding up-to-date container image.

In Step 5, the instantiated application function 116-x interacts with multiple backend services including the backend services 118-i and 118-j.

In Step 6, each of the backend services 118-i and 118-j may invoke one or more additional ones of the application functions 116 in accordance with the particular application being executed.

It is to be appreciated that these particular process steps, interactions and other features and functionality illustrated in the embodiment of FIG. 2 are presented by way of example only and can be varied in other embodiments.

Referring again to FIG. 1, the FaaS application backup orchestrator 108 of the compute services platform 105 is configured to capture state of the application for a particular point in time. The state of the application for the particular point in time is captured in accordance with a corresponding one of the FaaS application manifests 110. The application manifest for a particular one of the applications can be generated prior to or in conjunction with execution of that application in the compute services platform 105.

For example, the application manifest may be a previously-generated application manifest that is generated by the FaaS application backup orchestrator 108 prior to the FaaS application manager 106 receiving a request to execute the application in the FaaS environment. As another example, the application manifest may be generated for the application responsive to receipt of an initial request to execute the application in the FaaS environment. Other techniques for generating application manifests prior to or in conjunction with execution of corresponding applications in the FaaS environment may be used.

In some embodiments, each of the FaaS applications 112 has a corresponding one of the FaaS application manifests 110 that directs the manner in which backups are to be generated for that application. Such application manifests are assumed to be automatically generated using techniques disclosed herein.

In executing a given application under the control of the FaaS application manager 106, multiple ones of the application functions 116 are invoked with each such application function interacting with one or more of the backend services 118. Invocation of one or more of the application functions 116 may occur under conditions specified by one or more of the application function mappings 114. For example, the conditions specified by the one or more application function mappings may comprise respective events each relating to one or more of the backend services 118.

The FaaS application backup orchestrator 108 automatically generates an application manifest characterizing relationships between the application functions and the backend services utilized in executing the application. It also implements other functionality relating to capture and recovery, possibly in cooperation with one or more other components of the compute services platform 105, such as capturing state of the application for a particular point in time based at least in part on the application manifest, and performing operational recovery of the application for the particular point in time utilizing the captured state.

In some embodiments, the application manifest comprises a graph having a plurality of nodes corresponding to respective ones of the application functions and the backend services, with edges between respective pairs of the nodes each indicating one of an invocation of a particular one of the backend services by a particular one of the application functions and an invocation of a particular one of the application functions by a particular one of the backend services. The graph may comprise a directed graph in which directed edges between respective pairs of nodes indicate respective directions of invocation between the corresponding application functions and backend services. Other types of directed or non-directed graphs may be used to provide at least a portion of an application manifest in these and other embodiments.

As noted above, the application manifest for a given one of the FaaS applications 112 in the FIG. 1 embodiment is automatically generated within the system 100. Automatically generating the application manifest may comprise automatically detecting the application functions and the backend services associated with the given application. For example, the FaaS application backup orchestrator 108 may generate at least one list-functions command directed to a particular service provider and for each resulting application function executing at least one get-function-configuration command to determine its associated backend services 118. The service provider may be associated with a particular processing platform that is part of the FaaS environment. A given instance of the get-function-configuration command illustratively provides access to function code and environmental variables for a corresponding one of the application functions 116.

The application manifest may additionally or alternatively comprise a listing of the application functions of the application and a listing of backend services that are invoked by or invoke each of the application functions.

The automatic generation of the application manifest for a particular application in some embodiments illustratively comprises determining function code and environmental variables for at least a subset of the application functions 116, and responsive to a determination that the function code and the environmental variables for a given one of the application functions invokes a given one of the backend services 118, creating an edge between one node of the graph corresponding to the given application function and another node of the graph corresponding to the given backend service.

As another example, automatically generating the application manifest may comprise determining one or more triggers for each of at least a subset of the application functions 116 and responsive to a determination that one of the triggers for a given one of the application functions comprises a given one of the backend services, creating an edge between one node of the graph corresponding to the given backend service and another node of the graph corresponding to the given application function.

These and other techniques may be used to configure the nodes and edges of the graph in embodiments in which the application manifest comprises such a graph.

The graph in the application manifest can then be used to capture state of the application for the particular point in time by, for example, determining at least one set of connected nodes for the application in the graph, generating a backup of the set of connected nodes, and generating backups for respective ones of any of the backend services having corresponding nodes in the set of connected nodes. The latter two steps can be iterated for each distinct set of connected nodes for the application in the graph.

It should be noted that the term "graph" as used herein is intended to be broadly construed, and does not require use of an explicit graphical visualization. For example, the term is intended to encompass stored data or other information characterizing nodes and edges that collectively define a graphical representation if so rendered.

A particular one of the FaaS application manifests 110 for use in capturing state of a given one of the FaaS applications 112 in the present embodiment may additionally or alternatively comprise the one or more application function mappings associated with that FaaS application, container image identifiers for respective ones of the application functions invoked by the one or more application function mappings, and descriptors for respective ones of the one or more backend services with which the invoked application functions interact in executing the application.

The container image identifiers can include information such as container binaries or code snaps as well as other types of information. Accordingly, the term "container image identifier" as used herein is intended to be broadly construed. Illustrative embodiments are therefore not limited to capturing state using container binaries and may additionally or alternative utilize code snaps or other types of information characterizing one or more of the application functions in conjunction with capturing state.

The backend services descriptors in some case include access and provisioning information (e.g., how to access and/or provision backend services). It is to be appreciated, however, that different arrangements of metadata and other information can be included in an application manifest in other embodiments.

For example, the application manifest may additionally or alternatively comprise, for each of the one or more application functions of the application, a version indicator for the corresponding container image (e.g., Docker image), instructions for obtaining corresponding application function binaries or associated code, and one or more bindings of the application function to respective ones of the backend services with which the application function interacts. The instructions for obtaining corresponding application function binaries or associated code in such an arrangement illustratively comprise instructions for downloading one or more of the application function binaries or associated code from a container registry (e.g., Docker registry) or code hub. Other information that may be included in the application manifest includes a version indicator for that application manifest.

The application manifest therefore comprises metadata and other information relating to a particular application deployment and can be used both to deploy and to back up the application. The particular configuration of the application manifest can be specified by a developer or other user of the corresponding application. The application manifest advantageously serves to automate the backup orchestration of its corresponding application. It can in some cases be defined by a business organization to reflect the granularity of data protection to be applied.

A given one of the FaaS application manifests 110 may be automatically generated in conjunction with execution of its corresponding one of the FaaS applications 112 in the compute services platform 105.

For example, the given application manifest may be generated prior to an initial execution of the corresponding application in the compute services platform 105. In such an arrangement, initiating execution of the application responsive to a request may include initiating execution of the application based at least in part on the application manifest.

In capturing the state of the application for the particular point in time, the FaaS application backup orchestrator 108 is illustratively configured to store metadata for the one or more application function mappings that are part of the application manifest, to store a copy of a current binary or associated code for each application function container image identified in the application manifest, and to generate backups for each backend service having a descriptor in the application manifest. The FaaS application backup orchestrator 108 then generates additional metadata combining the metadata for the one or more application function mappings, the one or more stored copies of the current binaries or associated code, and the backups of the one or more backend services, into a corresponding application backup for the particular point in time.

It is therefore apparent that the FaaS application backup orchestrator 108 in this embodiment is responsible for capturing state of all components of a given application. The points in time at which backups of the application are taken can be in accordance with intervals specified by a corresponding user. For example, a user associated with a particular enterprise or other organization can take into account business continuity requirements in establishing appropriate points in time at which backups of the application will be taken. Such requirements can include service level agreements (SLAs) that may be in place with customers of the organization.

As another example, the FaaS application backup orchestrator 108 is illustratively configured to execute the following operations in capturing state of an application at a particular point in time:

1. Store a copy of the current binary of each application function container image that is part of the application manifest. Additionally or alternatively, corresponding code can be stored. References herein to storage of binaries or associated code should therefore be understood to encompass storage of binaries and/or code. The code may more particularly comprise source code while the corresponding binaries may refer to such source code after compilation into machine language.

2. Execute backup for all backend services that are part of the application manifest.

3. Store metadata for all application function mappings that are part of the application manifest. Additional related information such as environmental variables is also stored.

4. Create a metadata entry relating all the above copies, backups and metadata to a single application backup.

This application state capture process is just an example, and numerous alternative techniques can be used to capture state of an application in the FaaS application backup orchestrator 108.

The recovery module 109 of the FaaS application backup orchestrator 108 is configured in the present embodiment to perform operational recovery of an application for a particular point in time utilizing its state as captured in accordance with the corresponding application manifest.

For example, in some embodiments the recovery module 109 is configured to obtain the application backup for the particular point in time, to update the one or more application function mappings based at least in part on the stored metadata, to redeploy the application function container images from respective stored copies of their current binaries or associated code, and to recover the backend services from their respective backups.

The recovered application can then be executed under the control of one or both of the FaaS application manager 106 and the FaaS application backup orchestrator 108 using the updated one or more application function mappings, the redeployed application function container images and the recovered backend services.

As another example, the FaaS application backup orchestrator 108 is illustratively configured to execute the following operations in recovering the application using captured state for a particular point in time:

1. Allow the user to choose which of a plurality of backups of the application to use from a list of available backups.

2. Generate commands for a target portion of the compute services platform 105 that will:
   (i) update the application function mappings to the mappings that were in use when the selected backup was captured;
   (ii) redeploy application function container images from the selected backup; and
   (iii) recover all applicable backend services using the selected backup.

3. Execute the commands against the target portion of the compute services platform 105 in order to recover the application.

This application recovery process is just an example, and numerous alternative techniques can be used to recover a given application from captured state in the FaaS application backup orchestrator 108.

In illustrative embodiments, the FaaS application backup orchestrator 108 via its recovery module 109 is configured to recover a given application by recovering its corresponding instances of the application function mappings 114, application functions 116 and backend services 118 at a particular point in time. The recovered application is illustratively configured such that the application function images match corresponding schema of the restored backend services with which they interact and application function mapping conditions are also restored to the same point in time. The application comprising the various instances of application function mappings 114, application functions 116 and backend services 118 will therefore operate in exactly the same manner as it did at the point in time for which the backup was taken.

In some embodiments, the FaaS application backup orchestrator 108 is configured to capture state of application functions and backend services data of the application at each of a plurality of different points in time in accordance with the application manifest. The recovery module 109 can then permit user selection of at least one of a plurality of application backups characterizing the captured state for respective ones of the points in time, and to recover the application using the selected at least one of the application backups.

In an arrangement of this type, the user may be permitted to select a first one of the application backups for recovering the application functions and a second one of the application backups different than the first application backup for recovering the backend services data. Such an arrangement allows the application functions and the backend services data of the application to be separately recoverable from different ones of the application backups corresponding to respective different points in time as selected by the user.

It is also possible in recovering a given application to restore the application functions but not the backend services data, or to restore the backend services data but not the application functions. As noted above, the application functions and the backend services data can both be recovered, to the same or different points in time using the same or different backups of the application.

The FaaS application backup orchestrator 108 in some embodiments is implemented as part of an orchestration layer implemented in an otherwise conventional FaaS application architecture implemented in the compute services platform 105. Other system components such as the FaaS application manager 106 can interact with such an orchestration layer of the compute services platform 105.

Further details regarding capture and recovery of application state in compute services platforms of information processing systems will be described below in conjunction with the embodiments of FIGS. 3, 4 and 5.

Also, additional functionality for capture and recovery of serverless applications that may be implemented in a cloud-based compute services platform such as compute services platform 105 can be found in U.S. patent application Ser. No. 15/666,793, filed Aug. 2, 2017 and entitled "Operational Recovery of Serverless Applications in a Cloud-Based Compute Services Platform," which is incorporated by reference herein.

In the FIG. 1 embodiment, the compute services platform 105 is assumed to comprise one or more storage systems configured to store FaaS application manifests 110 and other information relating to FaaS applications 112, backend services 118 and other system functionality.

Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of compute services platform 105 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

The term "processing platform" as used herein is intended to be broadly construed so as to encompass, by way of illustration and without limitation, multiple sets of processing devices and one or more associated storage systems that are configured to communicate over one or more networks.

As a more particular example, the FaaS application manager 106 and FaaS application backup orchestrator 108 can each be implemented in the form of one or more LXCs running on one or more VMs. Other arrangements of one or more processing devices of a processing platform can be used to implement the FaaS application manager 106 and FaaS application backup orchestrator 108 as well as other components of the compute services platform 105. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the compute services platform 105 to reside in different data centers. Numerous other distributed implementations of the compute services platform 105 are possible.

Accordingly, one or both of the FaaS application manager 106 and the FaaS application backup orchestrator 108 can each be implemented in a distributed manner so as to comprise a plurality of distributed components implemented on respective ones of the plurality of compute nodes of the compute services platform 105.

Although illustratively shown as being implemented within the compute services platform 105, components such as FaaS application manager 106 and FaaS application backup orchestrator 108 in other embodiments can be implemented at least in part externally to the compute services platform 105. For example, such components can each be implemented at least in part within another system element or at least in part utilizing one or more stand-alone components coupled to the network 104.

It is to be appreciated that these and other features of illustrative embodiments are presented by way of example only, and should not be construed as limiting in any way.

Accordingly, different numbers, types and arrangements of system components such as FaaS application manager 106 and FaaS application backup orchestrator 108 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments functionality for automated capture and recovery of application state information can be offered to cloud infrastructure customers or other users as part of a PaaS offering.

The operation of the information processing system 100 will now be described in further detail with reference to the flow diagram of FIG. 3. The process as shown includes steps 300 through 306, and is suitable for use in the system 100 but is more generally applicable to other types of information processing systems comprising compute services platforms configured to run serverless applications and other types of applications configured to execute in a FaaS environment.

In step 300, an application in a FaaS environment is configured to utilize a plurality of application functions with each such application function interacting with one or more backend services in executing the application.

In step 302, an application manifest is automatically generated, prior to or in conjunction with execution of the application in the FaaS environment. The application manifest characterizes relationships between the application functions and the backend services utilized in executing the application.

As described previously, the application manifest illustratively comprises a graph having a plurality of nodes corresponding to respective ones of the application functions and the backend services, with edges between respective pairs of the nodes each indicating one of an invocation of a particular one of the backend services by a particular one of the application functions and an invocation of a particular one of the application functions by a particular one of the backend services. A more detailed example of a graph of this type will be described below in conjunction with FIG. 5.

In step 304, state of the application is captured for a particular point in time based at least in part on the application manifest. For example, capturing state of the application for a particular point in time based at least in part on the application manifest illustratively comprises determining at least one set of connected nodes for the application in the above-described graph, generating a backup of the set of connected nodes, and generating backups for respective ones of any of the backend services having corresponding nodes in the set of connected nodes.

In step 306, operational recovery of the application for the particular point in time is performed utilizing the captured state.

In some embodiments, the application manifest includes additional or alternative information, such as application function mappings, container image identifiers for respective ones of the application functions, and descriptors for respective ones of the backend services. Other types of additional or alternative information can be included in the application manifest in other embodiments.

Capturing the state of the application for the particular point in time may further comprise storing metadata for the one or more application function mappings that are part of the application manifest, storing a copy of a current binary or associated code for each application function container image identified in the application manifest, and generating backups for each backend service having a descriptor in the application manifest.

Additional metadata may be generated in order to combine the metadata for the one or more application function mappings, the one or more stored copies of the current binaries or associated code, and the backups of the one or more backend services, into an application backup for the particular point in time.

Performing operational recovery for the application in such embodiments may further comprise obtaining the application backup for the particular point in time, updating the one or more application function mappings based at least in part on the stored metadata, redeploying the application function container images from respective stored copies of their current binaries or associated code, and recovering the backend services from their respective backups. The recovered application is then executed utilizing the updated one or more application function mappings, the redeployed application function container images and the recovered backend services.

As mentioned previously, in some embodiments the state of application functions and backend services data of the application are captured at each of a plurality of different points in time in accordance with the application manifest. Users may then be permitted to select at least one of a plurality of application backups characterizing the captured state for respective ones of the points in time. The application is then recovered using the selected at least one of the application backups. Such an arrangement can allow the user to select a first one of the application backups for recovering the application functions and a second one of the application backups different than the first application backup for recovering the backend services data. The application functions and the backend services data of the FaaS application are thereby separately recoverable from different ones of the application backups corresponding to respective different points in time.

Figure 3:
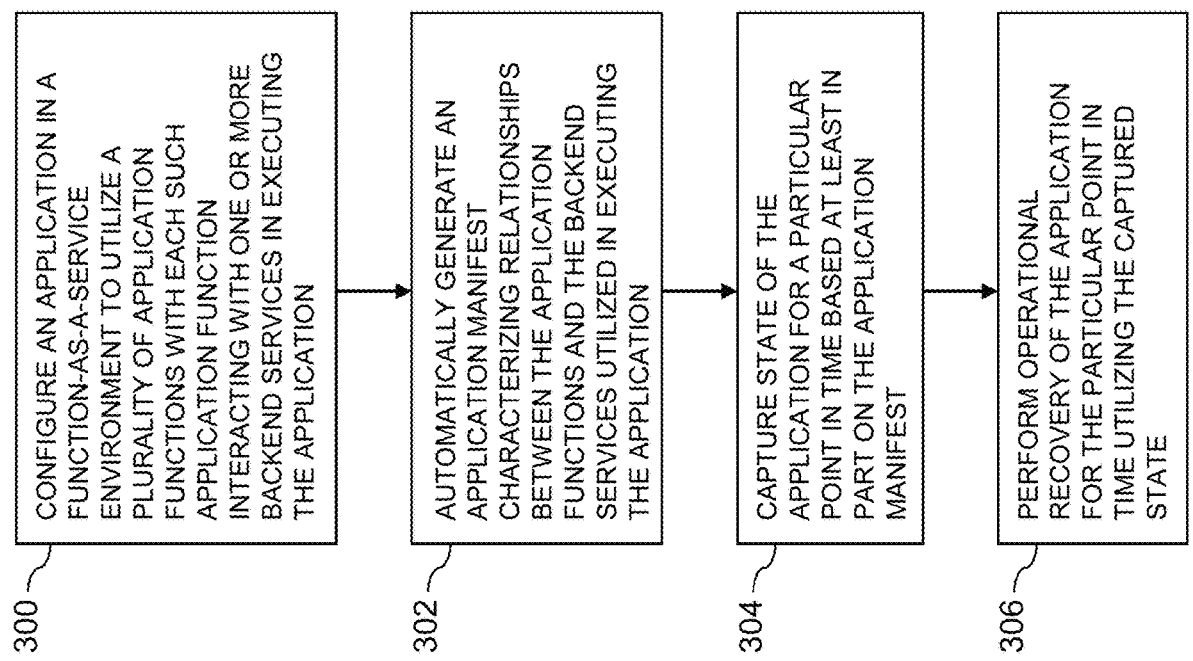
FIG. 3 is a flow diagram of a process utilizing an application manifest for capture and recovery of an application in a FaaS environment in an illustrative embodiment.

In the context of the FIG. 1 embodiment, the FaaS application manager 106 and the FaaS application backup orchestrator 108 are illustratively configured to control the performance of steps 300 through 306 of the FIG. 3 process. Other system entities can additionally or alternatively be utilized to control or execute one or more of these steps.

It is to be appreciated that the FIG. 3 process and other application state capture and recovery features and functionality described above can be adapted for use with other types of information systems configured to execute applications on a compute services platform or other type of processing platform.

The particular processing operations and other system functionality described in conjunction with the flow diagram of FIG. 3 are therefore presented by way of illustrative example only, and should not be construed as limiting the scope of the disclosure in any way. Alternative embodiments can use other types of processing operations involving execution of serverless applications or other types of applications in a FaaS environment. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different applications with respective operational recovery functionality within a FaaS environment of a given information processing system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments incorporating functionality for capture and recovery of serverless applications and other types of applications in FaaS environments will now be described with reference to FIGS. 4 and 5.

Figure 4:
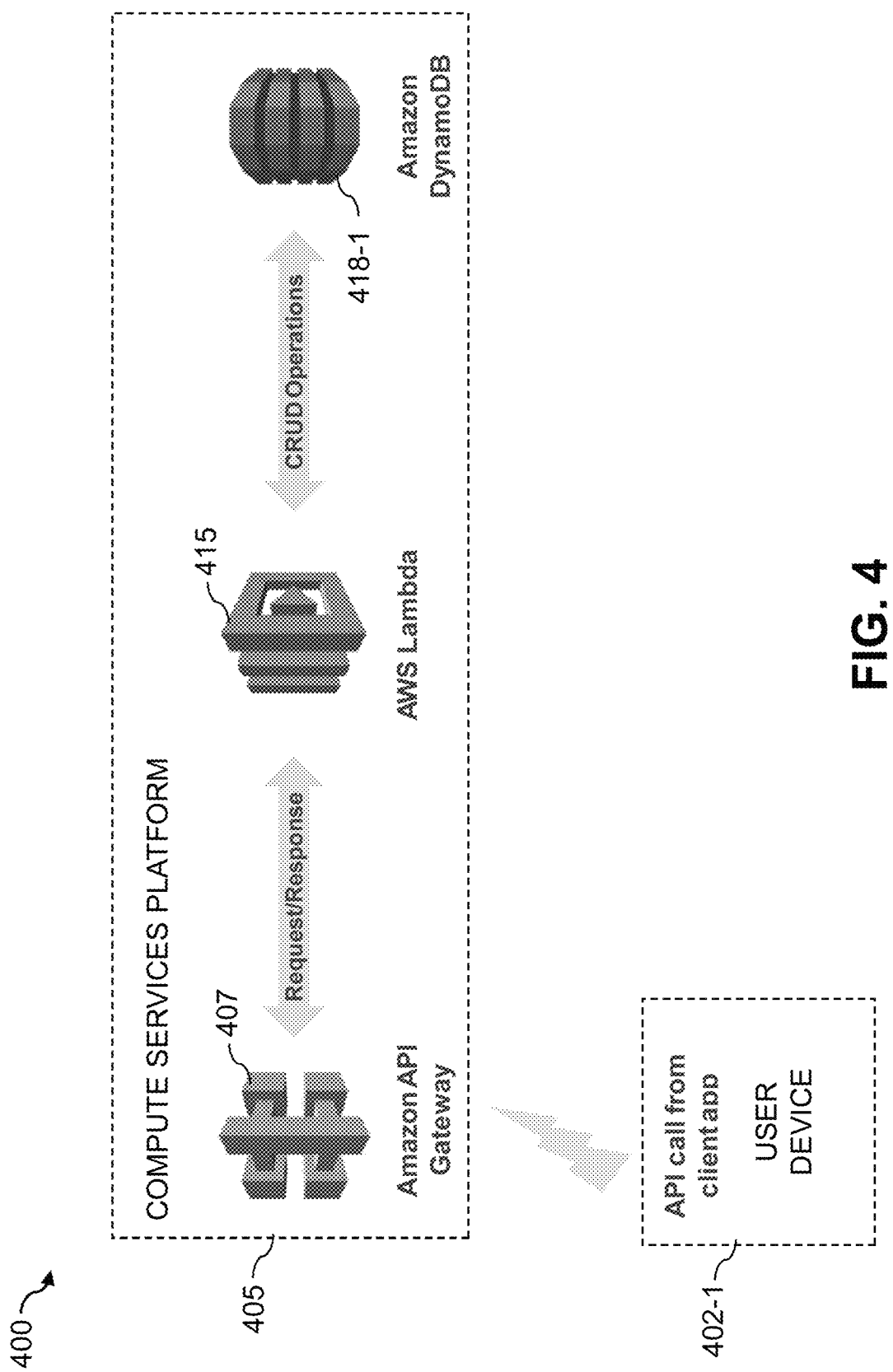
FIG. 4 shows another information processing system comprising a compute services platform providing a FaaS environment.

FIG. 4 shows another information processing system 400 comprising a compute services platform providing a FaaS environment. In the information processing system 400, a client application ("app") running on a user device 402-1 triggers execution of a FaaS application by generating one or more API calls to a compute services platform 405. The compute services platform 405 illustratively comprises an API gateway 407 and an AWS Lambda system 415. The AWS Lambda system 415 is assumed to interact with a plurality of backend services including an Amazon Dynamo database 418-1 in executing the FaaS application in the FaaS environment. The client application on the user device 402-1 generates a trigger in the form of an API call to a URL that identifies the API gateway 407. This trigger initiates execution of the FaaS application in the compute services platform 405, including at least one application function of the AWS Lambda system 405, such as storage of data in the database 418-1. Numerous additional or alternative application functions and associated backend services may be invoked in the course of execution of the FaaS application in the FaaS environment, although not explicitly illustrated in this simplified drawing.

The AWS Lambda system 415 in this embodiment is further assumed to implement conventional AWS Lambda functionality suitably modified to support automated capture and recovery for the FaaS application triggered by the client application running on the user device 402-1. The automated capture and recovery for the FaaS application in system 400 is based at least in part on automatically generating an application manifest for the FaaS application. The application manifest is assumed to comprise a graph characterizing relationships between the application functions and the backend services utilized in executing the FaaS application in the compute services platform 405. The application manifest is used to control capture and recovery in system 400 in substantially the same manner described previously in the context of system 100 of the FIG. 1 embodiment.

Figure 5:
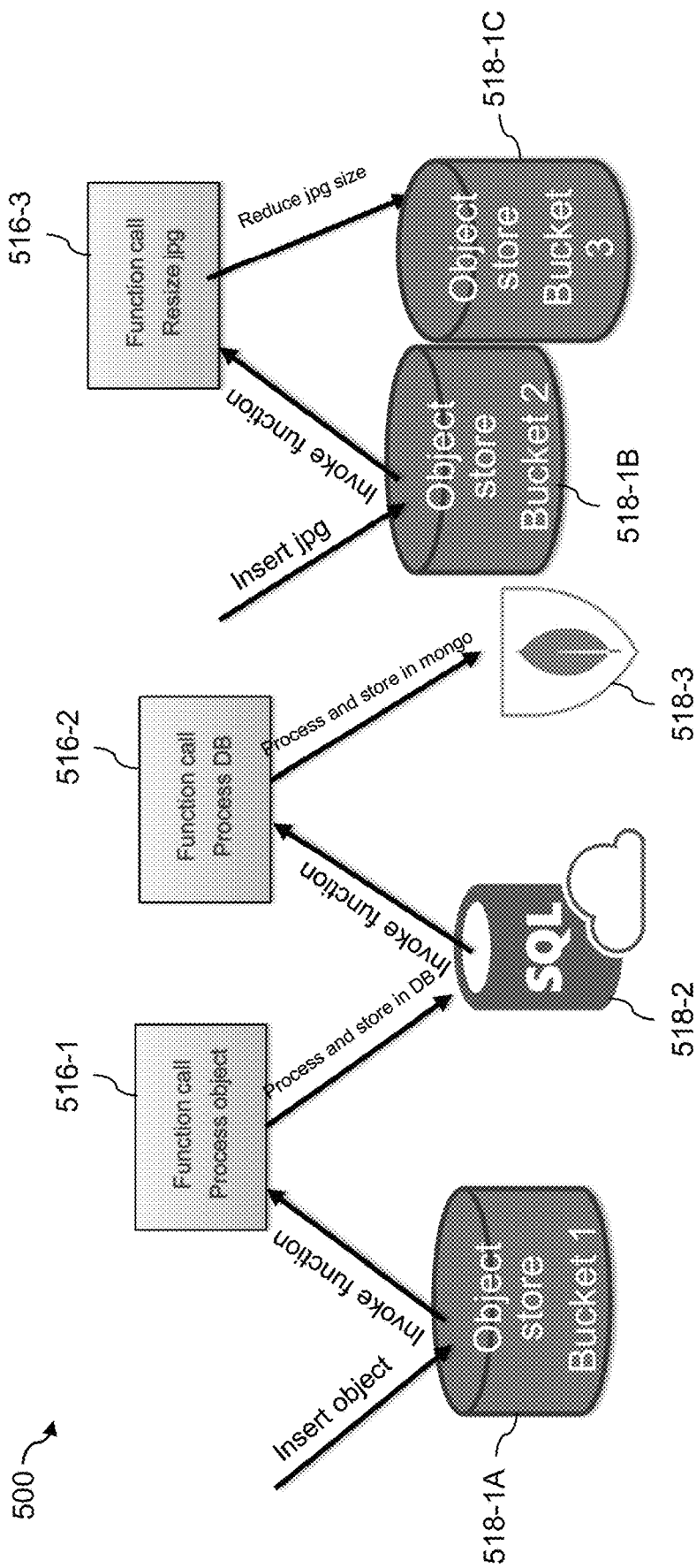
FIG. 5 illustrates interactions between application functions and backend services for multiple distinct applications in a FaaS environment.

Another illustrative embodiment is shown in FIG. 5. In this embodiment, an information processing system 500 comprises a FaaS environment in which different application functions 516 interact with different backend services 518 in executing two distinct FaaS applications. The application functions in this embodiment more particularly include respective application functions 516-1, 516-2 and 516-3 for respective "Process Object," "Process DB" and "Resize JPG" functions, also denoted in the context of this example by corresponding "function calls." The backend services 518 in this embodiment more particularly include three object store buckets 518-1A, 518-1B and 518-1C, also referred to as Object Store Bucket 1, Object Store Bucket 2 and Object Store Bucket 3, respectively, as well as SQL database 518-2 and MongoDB 518-3. The object store buckets are collectively referred to as object store 518-1. The system 500, like the system 400 previously described, is assumed to implement automated capture and recovery based at least in part on automatically-generated application manifests of the type previously described in conjunction with FIG. 1.

The first application executing in the FaaS environment of the system 500 has as its initial trigger the insertion of an object into the first object store bucket 518-1A. This in turn causes the first object store bucket 518-1A to invoke application function 516-1 to process the inserted object and store it in the SQL database 518-2. The SQL database 518-2 then invokes application function 516-2 to process and store at least portions of that database in MongoDB 518-3. The corresponding application manifest for the first application in this example comprises a graph including two nodes for respective ones of the application functions 516-1 and 516-2, three nodes for respective ones of the backend services 518-1A, 518-2 and 518-3, and a total of five edges given by the initial trigger and the four additional directed connections between the application functions and the backend services.

The second application executing in the FaaS environment of the system 500 has as its initial trigger the insertion of a JPEG image ("jpg") into the second object store bucket 518-1B. This in turn causes the second object store bucket 518-1B to invoke application function 516-3 to resize the inserted image and to store the resultant reduced-size image in the third object store bucket 518-1C. The corresponding application manifest for the second application in this example comprises a graph including one node for the application function 516-3, two nodes for respective ones of the object store buckets 518-1B and 518-1C, and a total of three edges given by the initial trigger and the two additional directed connections between the application function and the backend services.

The first and second applications are backed up in the system 500 utilizing their respective corresponding application manifests which comprise different graphs as described above. For example, capturing state of a given one of the applications for a particular point in time based at least in part on the application manifest may comprise determining the set of connected nodes for the application in the graph, generating a backup of the set of connected nodes, and generating backups for respective ones of any of the backend services having corresponding nodes in the set of connected nodes.

In backing up the first application, the set of connected nodes in the graph includes as backend services nodes the first object store bucket 518-1A as well as SQL database 518-2 and MongoDB 518-3. Each of these backend services may be backed up in the manner described elsewhere herein. Also, different techniques can be used to backup different ones of the backend services. For example, the object store 518-1 can be replicated using Amazon object replication to a different data zone, while the SQL database 518-2 and MongoDB 518-3 can use proprietary backups. Backups for one or more of the backup services can be created using respective corresponding Copy APIs if available. The backup of the first application additionally includes backups of the application functions and triggers as currently defined and reflected in the application manifest graph. The second application is assumed to be backed up in a similar manner, including backups of the backend services provided by object store buckets 518-1B and 518-1C.

The examples shown in FIG. 5 are simplified for purposes of illustration, but a given FaaS application could include many more application functions and associated backed services, with numerous associated invocations.

The application manifest can be periodically regenerated within the system 500 as additional application functions and associated backend services are added to the corresponding application, so as to ensure that the appropriate backups are generated for a particular desired point in time.

These and other embodiments automate the detection of application functions, backend services and other information that needs to be backed up to create a point in time copy of a given application executing in a FaaS environment.

This information is gathered in an automated manner within the system. For example, a set of list-function commands, get-function-configuration commands or other types of commands may be issued to one or more service providers in order to obtain a list of functions and associated function configurations for a given application.

Illustrative embodiments of systems with automated capture and recovery of application state in a FaaS environment as disclosed herein can provide a number of significant advantages relative to conventional arrangements.

For example, some embodiments are configured to generate an application manifest that provides in a single logical unit all of the metadata and other information required to support operational recovery of a serverless application or other type of application executing in a FaaS environment. The application manifest may comprise an automatically-generated graph having nodes corresponding to respective ones of a plurality of application functions and a plurality of backend services, with edges between pairs of the nodes indicating invocation of a backend service by an application function or vice-versa.

These and other embodiments automate the backup orchestration of applications in a particularly efficient and effective manner, eliminating the need for error-prone manual administration of backups.

Such arrangements overcome the difficulties that would otherwise be associated with conventional backups of applications. For example, applications involving highly complex mappings of application functions to backend services can be handled accurately and without manual intervention. Furthermore, applications that are subject to ongoing modification through addition or deletion of application functions and associated backend services can be easily accommodated. As a result, organizations and other users can obtain the advantages of a FaaS application architecture without compromising service level agreements of their production applications.

These embodiments can provide consistent operational recovery even in situations in which application function mapping conditions of the application were changed or newer versions of application function container images were uploaded.

As indicated previously, illustrative embodiments utilize a graph to characterize relationships detected between application functions and backend services for a given application executing in a FaaS environment. Such embodiments also allow the information in the graph to be backed up in conjunction with backing up the application.

Some embodiments provide a generic solution that can be utilized with any type of application that may be executed in a FaaS environment, regardless of whether the FaaS environment is cloud-based or on-premises.

These and other embodiments can considerably facilitate data protection management in multi-cloud environments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the compute services platform 105 or portions thereof are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as AWS S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
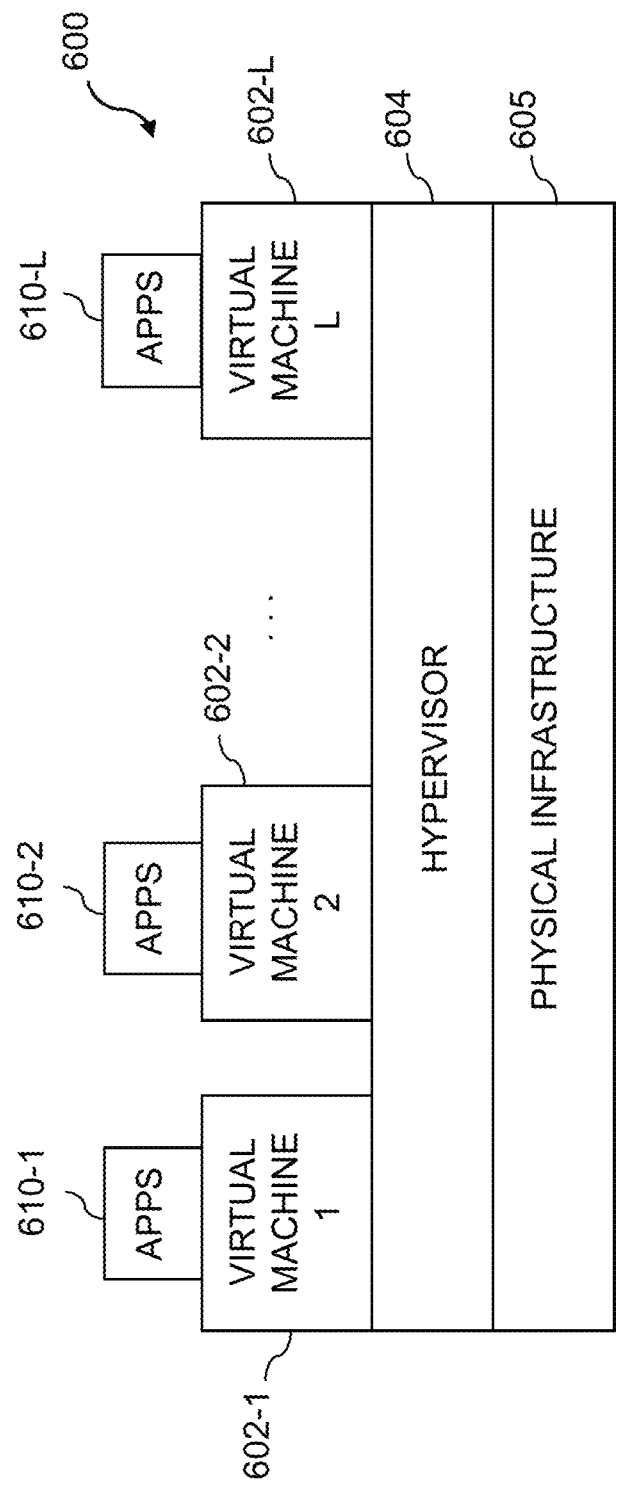
FIGS. 6 and 7 show examples of processing platforms that may be utilized to implement at least a portion of an information processing system in illustrative embodiments.
Figure 7:
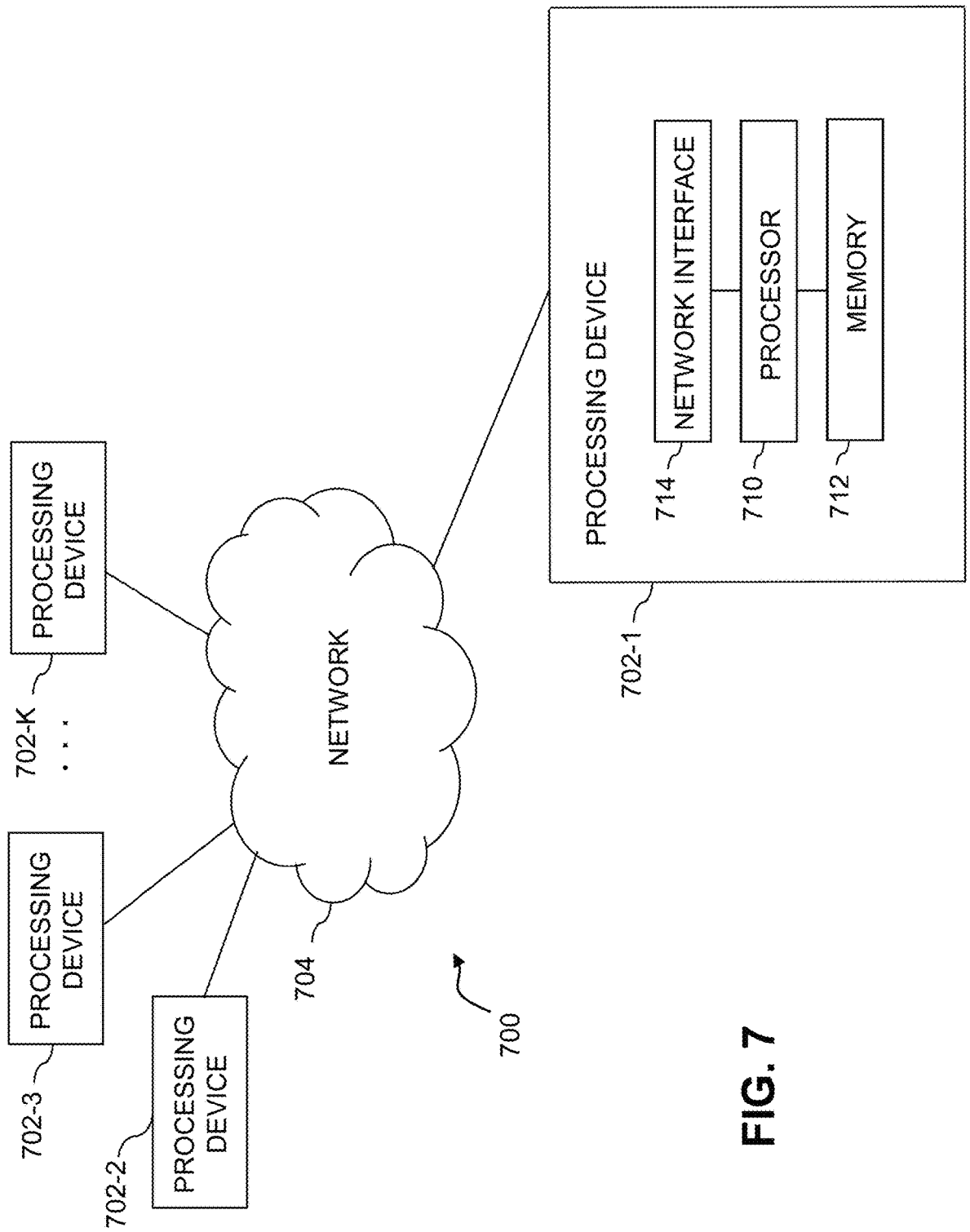

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute services platforms, FaaS applications, FaaS application managers, orchestrators and manifests, application function mappings, application functions and backend services. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
said at least one processing platform comprising a compute services platform accessible to a plurality of user devices over a network and being configured:
to receive a request to execute an application in a function-as-a-service environment of the compute services platform;
to initiate execution of the application in the function-as-a-service environment of the compute services platform responsive to the request;
to invoke a plurality of application functions of the function-as-a-service environment of the compute services platform with each such application function interacting with one or more backend services in executing the application;
to automatically generate an application manifest characterizing relationships between the application functions and the backend services utilized in executing the application;
to capture state of the application for a particular point in time based at least in part on the application manifest; and
to perform operational recovery of the application for the particular point in time utilizing the captured state;
wherein the application manifest comprises a graph having a plurality of nodes corresponding to respective ones of the application functions and the backend services;
wherein edges between respective pairs of the nodes each indicate one of: (i) an invocation of a particular one of the backend services by a particular one of the application functions, and (ii) an invocation of a particular one of the application functions by a particular one of the backend services;
wherein automatically generating the application manifest comprises:
determining one or more triggers for each of at least a subset of the application functions; and
based at least in part on one of the triggers for a given one of the application functions comprising a given one of the backend services, creating an edge between one node of the graph corresponding to the given backend service and another node of the graph corresponding to the given application function; and
wherein capturing state of the application for a particular point in time based at least in part on the application manifest comprises:
determining at least one set of connected nodes for the application in the graph;
generating a backup of the set of connected nodes; and
generating backups for respective ones of any of the backend services having corresponding nodes in the set of connected nodes.

2. The apparatus of claim 1 wherein the application comprises a serverless application.

3. The apparatus of claim 1 wherein the backend services comprise at least one of a database service, an object storage service and a message processing service.

4. The apparatus of claim 1 wherein invocation of the application functions occurs under conditions specified by one or more application function mappings.

5. The apparatus of claim 4 wherein the conditions specified by the application function mappings comprise respective events each relating to one or more of the backend services.

6. The apparatus of claim 1 wherein automatically generating the application manifest comprises automatically detecting the application functions and the backend services.

7. The apparatus of claim 6 wherein automatically generating the application manifest comprises automatically detecting the application functions by generating at least one list-functions command directed to a particular service provider and for each resulting application function executing at least one get-function-configuration command to determine its associated backend services.

8. The apparatus of claim 7 wherein a given instance of the get-function-configuration command provides access to function code and environmental variables for a corresponding one of the application functions.

9. The apparatus of claim 1 wherein the application manifest comprises:
a listing of the application functions of the application; and
a listing of backend services that are invoked by or invoke each of the application functions.

10. The apparatus of claim 1 wherein automatically generating the application manifest comprises determining function code and environmental variables for at least a subset of the application functions and responsive to a determination that the function code and the environmental variables for a given one of the application functions invokes a given one of the backend services, creating an edge between one node of the graph corresponding to the given application function and another node of the graph corresponding to the given backend service.

11. The apparatus of claim 1 wherein the graph comprises a directed graph in which directed edges between respective pairs of nodes indicate respective directions of invocation between the corresponding application functions and backend services.

12. The apparatus of claim 1 wherein performing operational recovery comprises:
determining one or more backups of the application;
generating one or more commands for a target portion of the compute services platform based at least in part on the one or more backups; and
executing the one or more commands against the target portion of the compute services platform to recover the application;
wherein the one or more commands are configured for:
updating application function mappings to mappings that were in use when the one or more backups were captured;
redeploying application function container images from the one or more backups; and
recovering applicable backend services using the one or more backups.

13. A method comprising:
receiving a request to execute an application in a function-as-a-service environment, the function-as-a-service environment being implemented in a compute services platform accessible to a plurality of user devices over a network;
initiating execution of the application in the function-as-a-service environment of the compute services platform responsive to the request;
invoking a plurality of application functions of the function-as-a-service environment of the compute services platform with each such application function interacting with one or more backend services in executing the application;
automatically generating an application manifest characterizing relationships between the application functions and the backend services utilized in executing the application;
capturing state of the application for a particular point in time based at least in part on the application manifest; and
performing operational recovery of the application for the particular point in time utilizing the captured state;
wherein the application manifest comprises a graph having a plurality of nodes corresponding to respective ones of the application functions and the backend services;
wherein edges between respective pairs of the nodes each indicate one of: (i) an invocation of a particular one of the backend services by a particular one of the application functions, and (ii) an invocation of a particular one of the application functions by a particular one of the backend services;
wherein automatically generating the application manifest comprises:
determining one or more triggers for each of at least a subset of the application functions; and
based at least in part on one of the triggers for a given one of the application functions comprising a given one of the backend services, creating an edge between one node of the graph corresponding to the given backend service and another node of the graph corresponding to the given application function; and
wherein capturing state of the application for a particular point in time based at least in part on the application manifest comprises:
determining at least one set of connected nodes for the application in the graph;
generating a backup of the set of connected nodes; and
generating backups for respective ones of any of the backend services having corresponding nodes in the set of connected nodes.

14. The method of claim 13 wherein the graph comprises a directed graph in which directed edges between respective pairs of nodes indicate respective directions of invocation between the corresponding application functions and backend services.

15. The method of claim 13 wherein the application manifest comprises:
a listing of the application functions of the application; and
a listing of backend services that are invoked by or invoke each of the application functions.

16. The method of claim 13 wherein automatically generating the application manifest comprises determining function code and environmental variables for at least a subset of the application functions and responsive to a determination that the function code and the environmental variables for a given one of the application functions invokes a given one of the backend services, creating an edge between one node of the graph corresponding to the given application function and another node of the graph corresponding to the given backend service.

17. A computer program product comprising a non-transitory processor-readable storage medium having stored therein program code of one or more software programs, wherein the program code when executed by at least one processing platform, said at least one processing platform comprising a compute services platform accessible to a plurality of user devices over a network, causes said at least one processing platform:
to receive a request to execute an application in a function-as-a-service environment, the function-as-a-service environment being implemented in the compute services platform;
to initiate execution of the application in the function-as-a-service environment of the compute services platform responsive to the request;
to invoke a plurality of application functions of the function-as-a-service environment of the compute services platform with each such application function interacting with one or more backend services in executing the application;
to automatically generate an application manifest characterizing relationships between the application functions and the backend services utilized in executing the application;
to capture state of the application for a particular point in time based at least in part on the application manifest; and
to perform operational recovery of the application for the particular point in time utilizing the captured state;
wherein the application manifest comprises a graph having a plurality of nodes corresponding to respective ones of the application functions and the backend services;
wherein edges between respective pairs of the nodes each indicate one of: (i) an invocation of a particular one of the backend services by a particular one of the application functions, and (ii) an invocation of a particular one of the application functions by a particular one of the backend services;
wherein automatically generating the application manifest comprises:
determining one or more triggers for each of at least a subset of the application functions; and
based at least in part on one of the triggers for a given one of the application functions comprising a given one of the backend services, creating an edge between one node of the graph corresponding to the given backend service and another node of the graph corresponding to the given application function; and
wherein capturing state of the application for a particular point in time based at least in part on the application manifest comprises determining at least one set of connected nodes for the application in the graph, generating a backup of the set of connected nodes, and generating backups for respective ones of any of the backend services having corresponding nodes in the set of connected nodes.

18. The computer program product of claim 17 wherein performing operational recovery comprises:
determining one or more backups of the application;

generating one or more commands for a target portion of the compute services platform based at least in part on the one or more backups; and executing the one or more commands against the target portion of the compute services platform to recover the application;

wherein the one or more commands are configured for:

updating application function mappings to mappings that were in use when the one or more backups were captured;

redeploying application function container images from the one or more backups; and recovering applicable backend services using the one or more backups.

19. The computer program product of claim 17 wherein the graph comprises a directed graph in which directed edges between respective pairs of nodes indicate respective directions of invocation between the corresponding application functions and backend services.

20. The computer program product of claim 17 wherein the application manifest comprises:

a listing of the application functions of the application; and a listing of backend services that are invoked by or invoke each of the application functions.

* * * * *